(12) United States Patent
Cooper et al.

(10) Patent No.: US 10,433,497 B2
(45) Date of Patent: Oct. 8, 2019

(54) PORTABLE LEAF BLOWER

(71) Applicant: Canadian Tire Corporation Limited, Toronto, Ontario (CA)

(72) Inventors: Bruce Matthew T. Cooper, Toronto (CA); Anthony Wolf, Toronto (CA)

(73) Assignee: Canadian Tire Corporation, Limited, Toronto, Ontario (CA)

( * ) Notice: Subject to any disclaimer, the term of this patent is extended or adjusted under 35 U.S.C. 154(b) by 220 days.

(21) Appl. No.: 15/563,855

(22) PCT Filed: Apr. 9, 2015

(86) PCT No.: PCT/CA2015/050289
§ 371 (c)(1),
(2) Date: Oct. 2, 2017

(87) PCT Pub. No.: WO2016/161497
PCT Pub. Date: Oct. 13, 2016

(65) Prior Publication Data
US 2018/0070536 A1      Mar. 15, 2018

(51) Int. Cl.
*A01G 20/43*    (2018.01)
*E01H 1/08*     (2006.01)
*A01G 20/47*    (2018.01)

(52) U.S. Cl.
CPC .............. *A01G 20/43* (2018.02); *A01G 20/47* (2018.02); *E01H 1/0809* (2013.01)

(58) Field of Classification Search
CPC ....... A01G 20/43; A01G 20/47; E01H 1/0809
See application file for complete search history.

(56) References Cited

U.S. PATENT DOCUMENTS

| 4,413,371 | A | * | 11/1983 | Tuggle | ............... | E01H 1/0809 |
| | | | | | | 15/328 |
| 4,734,017 | A | * | 3/1988 | Levin | .................. | A47L 5/24 |
| | | | | | | 417/366 |
| 5,722,111 | A | * | 3/1998 | Sowell | .................. | A01G 20/47 |
| | | | | | | 15/330 |
| 6,105,206 | A | * | 8/2000 | Tokumaru | ............ | A47L 5/14 |
| | | | | | | 15/344 |
| 2017/0231163 | A1 | * | 8/2017 | Nolin | .................. | B08B 5/02 |
| | | | | | | 15/405 |

* cited by examiner

*Primary Examiner* — David Redding
(74) *Attorney, Agent, or Firm* — Patrick J. Hofbauer (57) ABSTRACT

A portable leaf blower comprises a housing having an air inlet and an air outlet port and defines an air outlet port axis. A handle is attached to the housing. A motor is mounted within the housing, with the motor mount having a rotatable drive shaft. A rotatable impeller is mounted on the drive shaft for rotation therewith, and to draw air into the air inlet and to blow the air out of the air outlet port in generally parallel relation to the air outlet port axis. A blower tube has a tube ingress port and a tube egress port, and defines a tube ingress port axis. The blower tube is connectable in supported relation to one of the housing and the handle, such that the tube ingress port is positioned in spaced relation to the air outlet port, with the air outlet port axis being coincident with the tube ingress port axis.

20 Claims, 7 Drawing Sheets

PORTABLE LEAF BLOWER

FIELD OF THE INVENTION

This invention relates to portable leaf blowers, and more particularly to portable leaf blowers having high airflow efficiency.

BACKGROUND OF THE INVENTION

Conventional portable leaf blowers typically comprise a housing having an air inlet and an air outlet, and an elongate blower tube connectable in airflow receiving relation to the air outlet. An electrically powered motor or an internal combustion engine mounted within the housing drives an air impeller, or the like. The air impeller draws a significant amount of airflow into the housing through the air inlet, and blows a forceful airflow out of the housing through the air outlet, and thereafter through the blower tube. The airflow egresses the blower tube through an air egress port to move debris, such as leaves, on a surface being cleaned.

In order to be maximally effective, it is highly desirable to produce the best combination of volume of airflow and speed of airflow. It is generally known in the industry that a certain size of motor or engine along with a certain diameter of blower tube will produce approximately a certain volume and speed of airflow at approximately a known efficiency. On an overall basis, in order to produce an airflow of greater volume and speed, which are generally desirable characteristics, it seems to be a simple matter of using a larger motor or engine. However, since leaf blowers must be carried by individuals, often for a lengthy period of time, it is important to minimize the weight of the leaf blower. It is also highly desirable to minimize the cost of a leaf blower, for marketing and sales purposes. Additionally, more powerful motors and engines are typically noisier for a given design, particularly when internal combustion engines are concerned, such that bigger, more powerful motors and engines are generally less desirable from noise abatement and work-hazard standpoints. It therefore follows that producing the maximum amount of air flow from a motor or engine of low power output is highly desirable, as merely using larger motors or engines to achieve airflow of greater volume and speed is not an entirely acceptable solution.

Accordingly, various prior art devices exist to supposedly produce more effective airflow from leaf blowers, without increasing the size, power, and/or cost of the motor or engine. An example of one such device is disclosed in U.S. Design Pat. No. D382683, issued Aug. 19, 1997, to Henke et al., and entitled Air Nozzle For A Leaf Blower. This air nozzle has an ingress port and three egress ports. The cross-sectional area of the three egress ports is significantly less than the cross-sectional area of the ingress port. Accordingly, the speed of the airflow is greater through the three egress ports than it is through the one ingress port. However, it is believed that the overall cross-sectional area of the airflow produced is smaller than if the nozzle was not present, which may be undesirable. Further, the narrowing of the airflow in this manner typically causes some resistance to airflow, which is also undesirable.

Another type of attachment that has been developed in an attempt to produce more effective airflow in air blowers is a type of Venturi tube that can be used with leaf blowers, and which is described at the following publish link available at the filing date of this application: http://www.thingiverse.com/thing:176094. This attachment device comprises an annular outer wall longitudinally divided by a cone shaped funnel having a reduced diameter central port. A plurality of small oval openings arranged around the circumference of the annular outer wall are adjacent the reduced diameter central port. High speed airflow from the reduced diameter central port draws (entrains) additional air into the interior of the attachment through the small oval openings in an attempt to augment the overall effectiveness of the portable leaf blower that utilizes the attachment. This attachment is less effective in increasing air flow than the present invention, and its design increases the resistance to air flow through the device. Moreover, air flow through a leaf blower fitted with this device is necessarily unidirectional. Also, that air flow through the cone-shaped funnel portion of this device is conducive to clogging and blockage with debris, such as leaves, sticks, stones and rocks, which types of debris is routinely encountered in outdoor use.

It is an object of the present invention to provide a portable leaf blower having improved efficiency.

It is another object of the present invention to provide a high air volume portable leaf blower.

It is another object of the present invention to provide a high air volume portable leaf blower that is efficient in terms of airflow production.

It is another object of the present invention to provide a high air volume portable leaf blower that produces more airflow than a comparable leaf blower having the same power rated motor or engine.

It is still a further object of the present invention to provide a high air volume portable leaf blower having low power consumption.

It is another object of the present invention to provide a high air volume portable leaf blower that is efficient in terms of the amount of airflow produced by an electrically powered motor and impeller.

It is yet a further object of the present invention to provide a high air volume portable leaf blower that is lightweight as compared to portable leaf blowers capable of producing similar air volumes flow rates.

It is yet a further object of the present invention to provide a high air volume portable leaf blower that is not too heavy for a user to use comfortably.

It is yet a further object of the present invention to provide a high air volume portable leaf blower that is not too heavy for a user to use comfortably for an extended period of time.

It is yet a further object of the present invention to provide a high air volume portable leaf blower that can be produced for a competitive cost.

It is yet a further object of the present invention to provide a high air volume portable leaf blower that is relatively quiet for its effective air volume flow rate.

It is yet a further object of the present invention to provide a high air volume portable leaf blower that has minimal resistance to airflow.

It is still a further object of the present invention to provide a high air volume portable leaf blower, wherein the airflow produced by the impeller is not slowed significantly by increased air flow resistance along its path.

It is still a further object of the present invention to provide a high air volume portable leaf blower, wherein the airflow emitted from the blower tube of the portable leaf blower is greater than the airflow originally produced by the impeller.

It is yet a further object of the present invention to provide a high air volume portable leaf blower that is more effective than prior art leaf blowers having comparable weight and/or power ratings.

SUMMARY OF THE INVENTION

In accordance with at least one aspect of the present invention there is disclosed a novel portable leaf blower comprising a housing having an air inlet and an air outlet port and defining an air outlet port axis. A handle is attached to the housing. A motor is mounted within the housing, with the motor having a rotatable drive shaft. A rotatable impeller is mounted on the drive shaft for rotation therewith, and to draw air into the air inlet and to blow the air out of the air outlet port in generally parallel relation to the air outlet port axis. A blower tube has a tube ingress port and a tube egress port, and defines a tube ingress port axis. The blower tube is connectable in supported relation to at least one of the housing and the handle, such that the tube ingress port is positioned in spaced relation to the air outlet port, with the air outlet port axis being coincident with the tube ingress port axis.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the portable leaf blower according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE INVENTION

Reference will now be made by way of non-limiting example to FIGS. 1 through 7, which show one embodiment of an a portable leaf blower 100 according to the present invention.

In brief, the portable leaf blower 100 comprises a housing 110, a handle 120, a motor 130, a rotatable impeller 140, a blower tube 150, at least one spacer member 160, and a collar member 170.

In the embodiment illustrated, the portable leaf blower 100 comprises a housing 110 having a left air inlet 112a and a right air inlet 112b, and an air outlet port 114 defining an air outlet port axis "OP". The housing 110 may have a generally cylindrical main body 116 and a housing outlet tube 117 oriented generally tangentially to the main body 116. The left air inlet 112a and the right air inlet 112b are preferably disposed, as shown, on opposite sides of the main body 116, and the air outlet port 114 is disposed at the distal end 118 of the housing outlet tube 117. As illustrated, but not essentially, the distal end 118 of the housing outlet tube 117 is preferably substantially coincident with the front edge 171 of the collar 170. The handle 120 is attached to the housing 110 for permitting a user to carry and manually manipulate the portable leaf blower 100. An electrical switch 119, which is preferably of the momentary contact type, is mounted on the underside of the handle 120 in a convenient location for ready operation by typically the forefinger of the user.

An electric motor 130 is securely mounted in a conventional manner within the housing 110 and has a rotatable drive shaft 132 for driving a rotatable impeller 140. The motor 130 is selected from a group consisting of: AC powered motors, DC powered motors, and gasoline powered motors. An AC powered motor would typically be powered directly from a conventional AC power source, or in other words a 110 volt VAC or 220 VAC outlet through an electrical cord. A DC powered motor would typically be powered by rechargeable batteries that would be located within, or attached to, the housing 110. A gasoline powered motor would be powered by any suitable type of gasoline, or similar combustible fuel.

The rotatable impeller 140 is mounted on the drive shaft 132 for rotation therewith. The rotatable impeller 140 draws air into the left air inlet 112a and the right air inlet 112b, as indicated by arrows "A", through the housing 110, as indicated by arrows "B", and forcefully blows the drawn air through the housing outlet tube 117, as indicated by arrows "C", and out of the air outlet port 114 in a direction that is generally parallel in relation to the air outlet port axis "OP", as indicated by arrows "D". In this manner, the airflow is properly directed to be received by the blower tube 150.

The blower tube 150 has a tube ingress port 152 at an air ingress end 153 and tube egress port 154 at an air egress end 155. The blower tube 150 defines a tube ingress port axis "IP" at the tube ingress port 152, and defines a tube egress port axis "EP" at the tube egress port 154. As can be best seen FIGS. 2 through 4 and 6, the tube egress port axis "EP" is in generally aligned parallel relation to the tube ingress port axis "IP".

Figure 1:
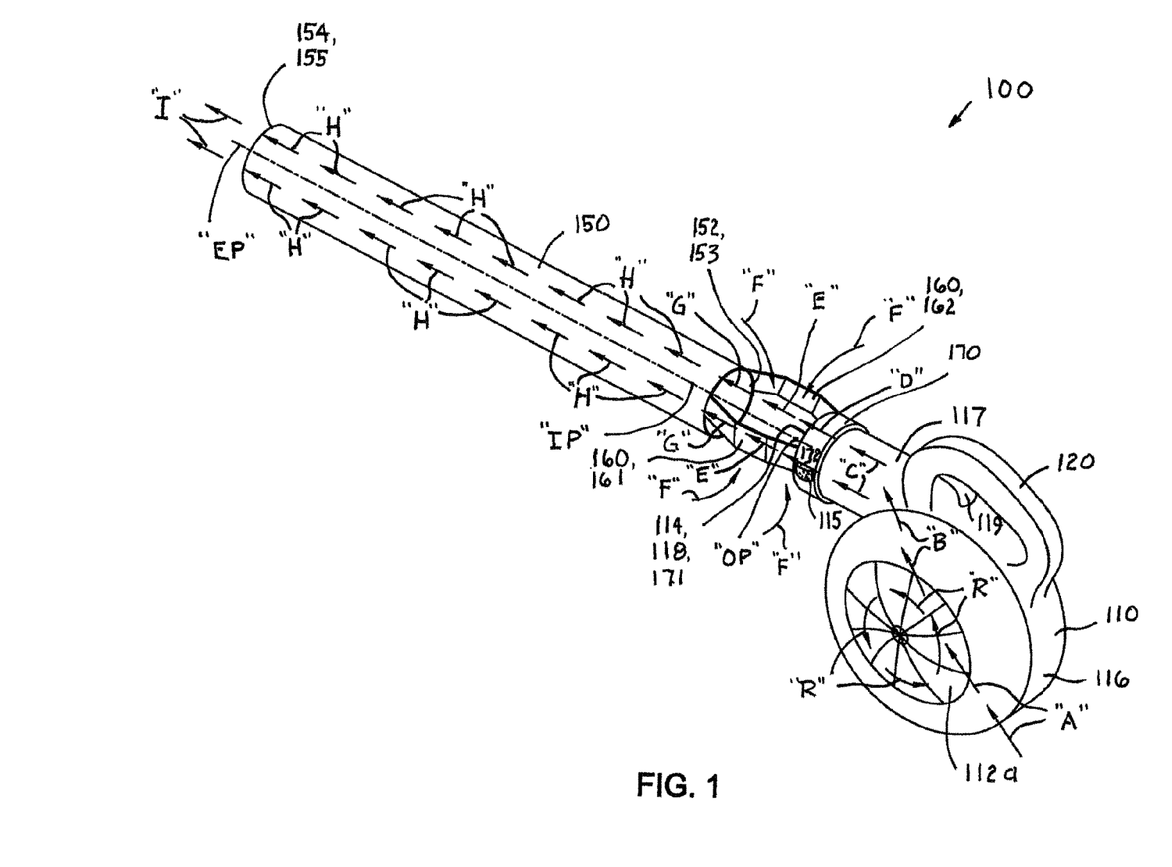
FIG. 1 is a perspective view from the right rear of an embodiment of a portable leaf blower constructed utilizing principles of the present invention.
Figure 2:
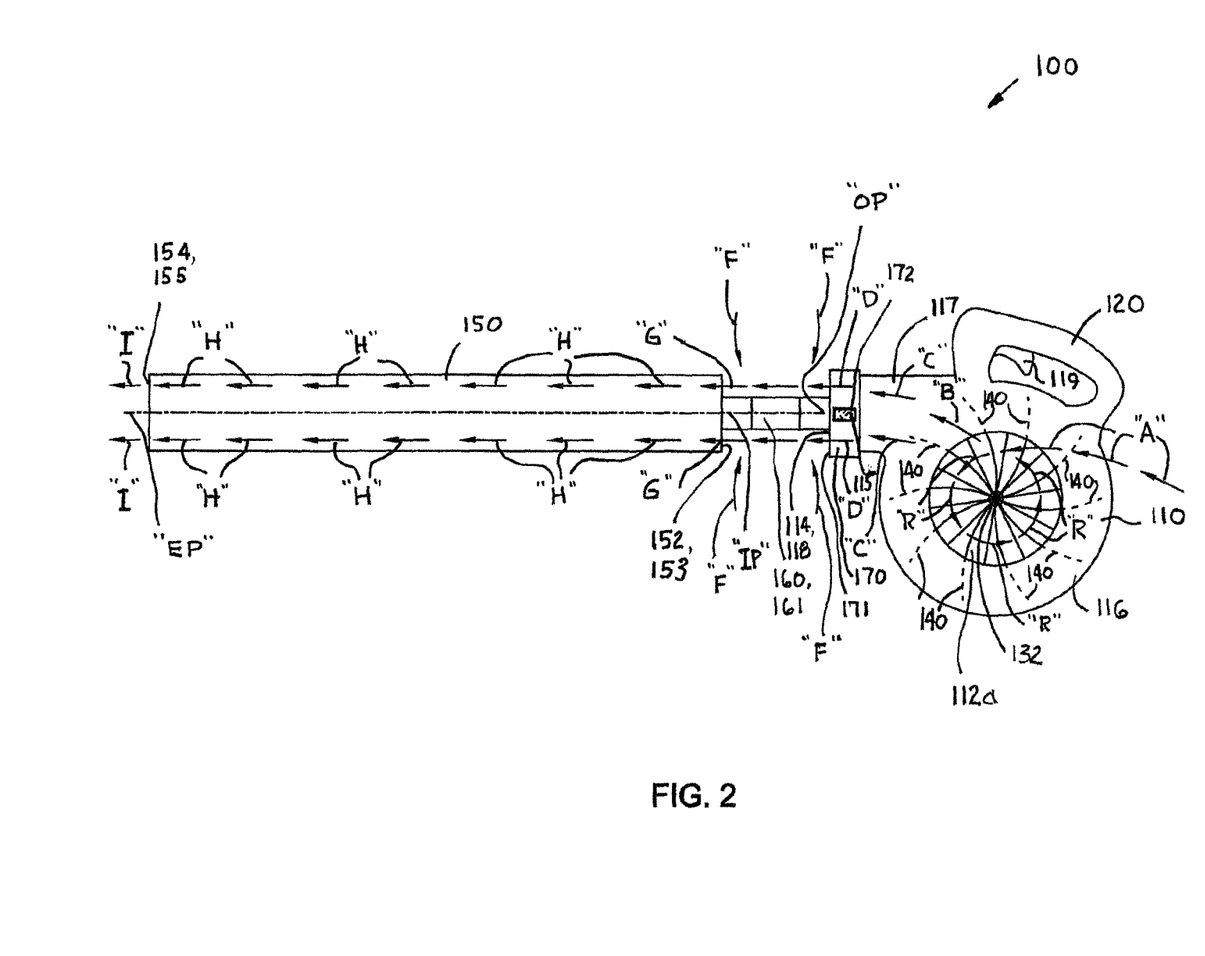
FIG. 2 is a left side elevational view of the portable leaf blower of FIG. 1.
Figure 3:
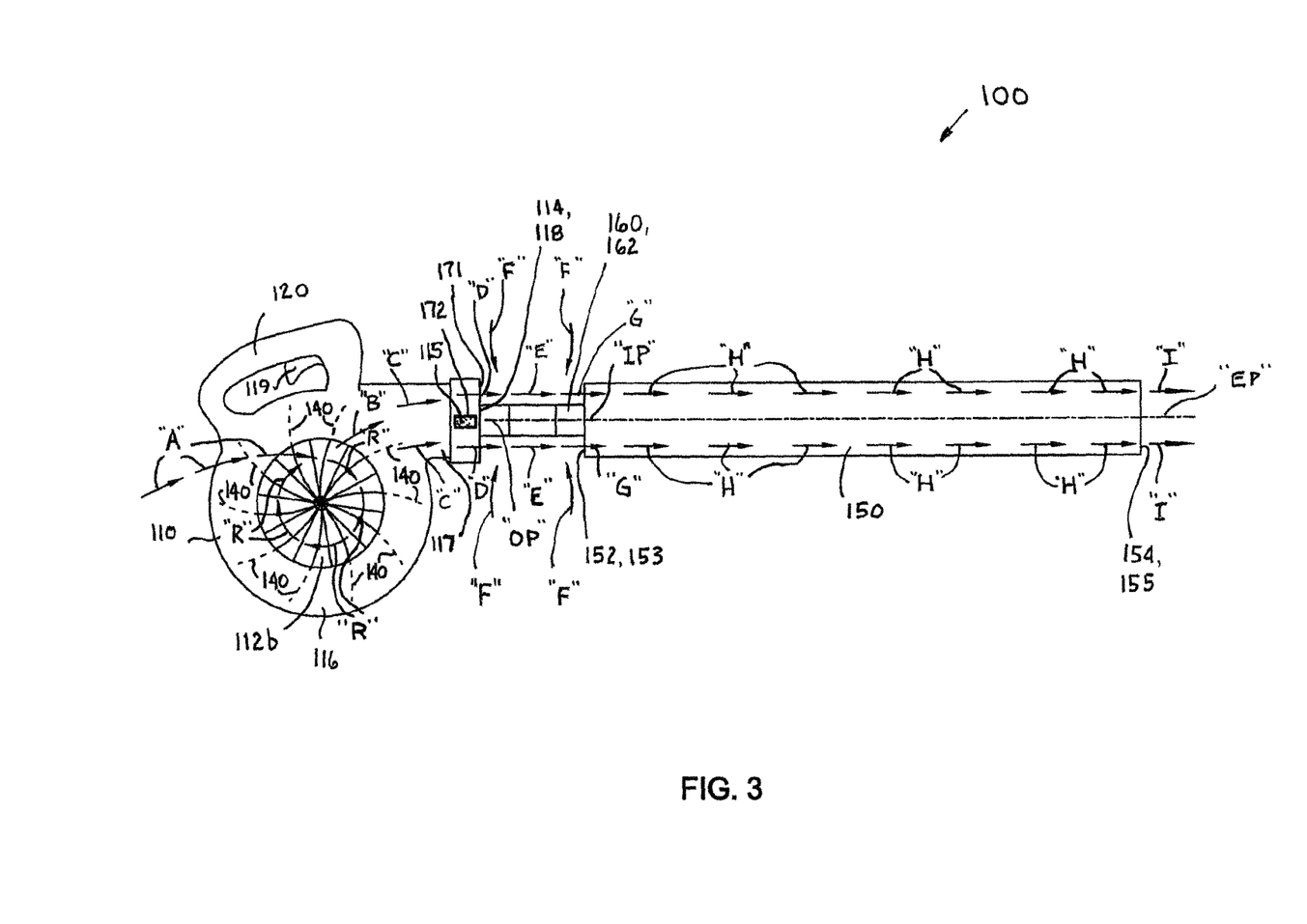
FIG. 3 is a right side elevational view of the portable leaf blower of FIG. 1.
Figure 4:
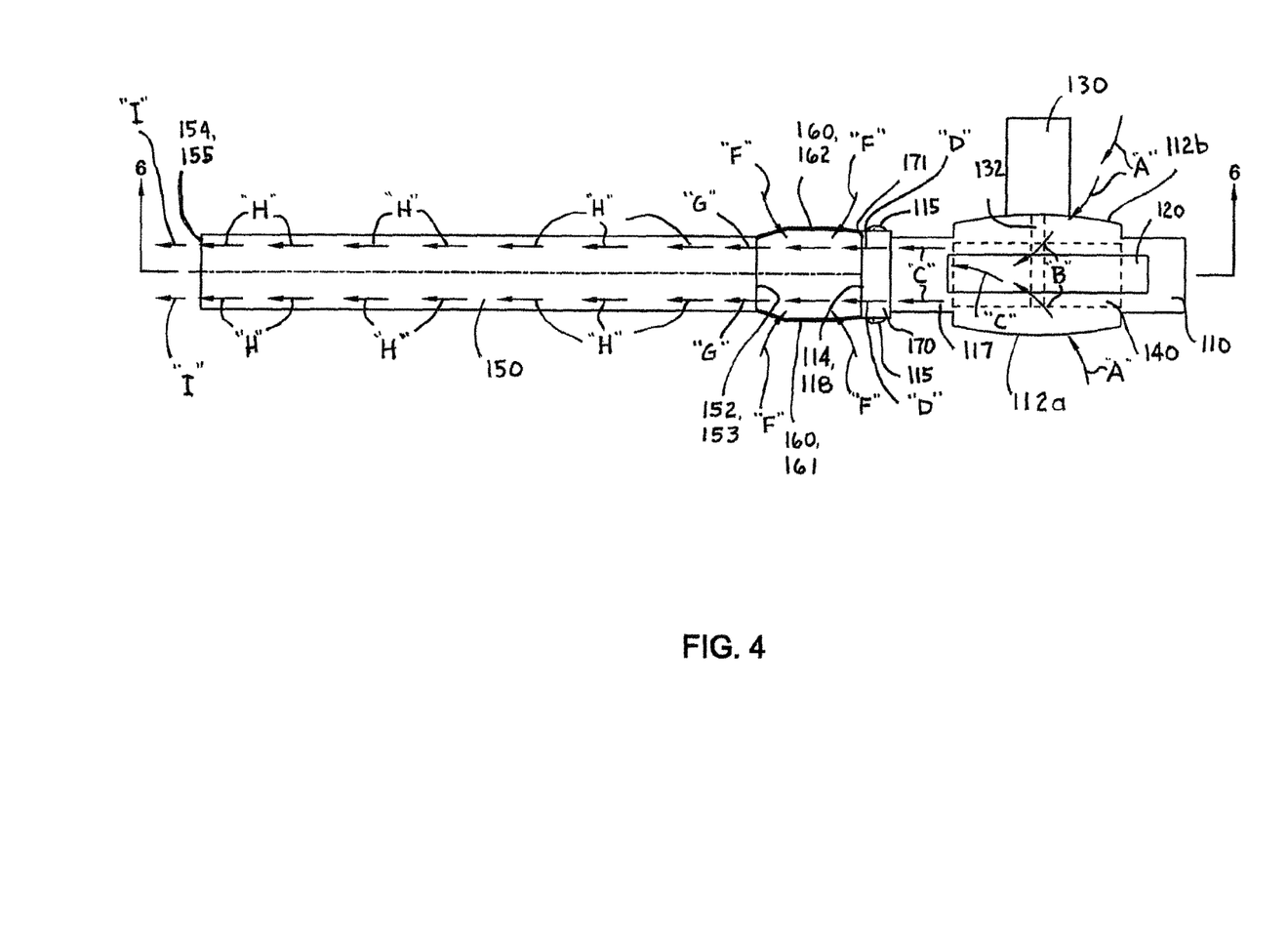
FIG. 4 is a top plan view of the portable leaf blower of FIG. 1.
Figure 5:
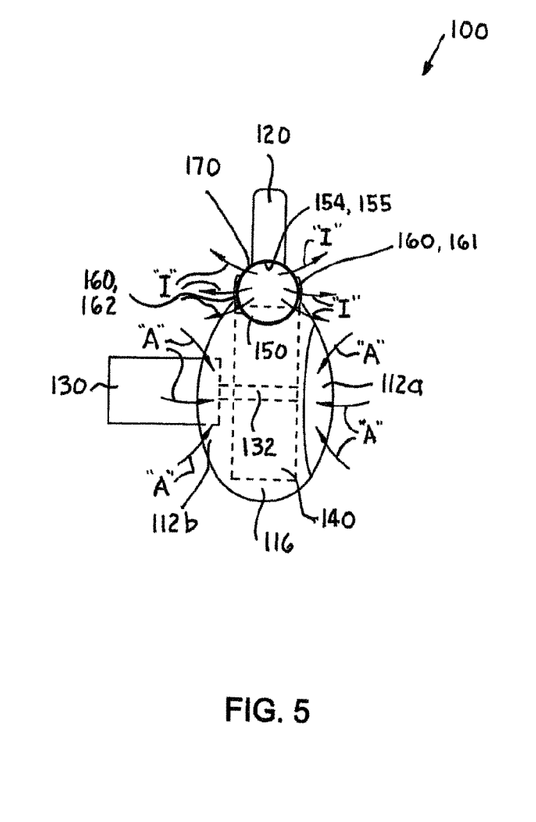
FIG. 5 is a front end elevational view of the portable leaf blower of FIG. 1.
Figure 6:
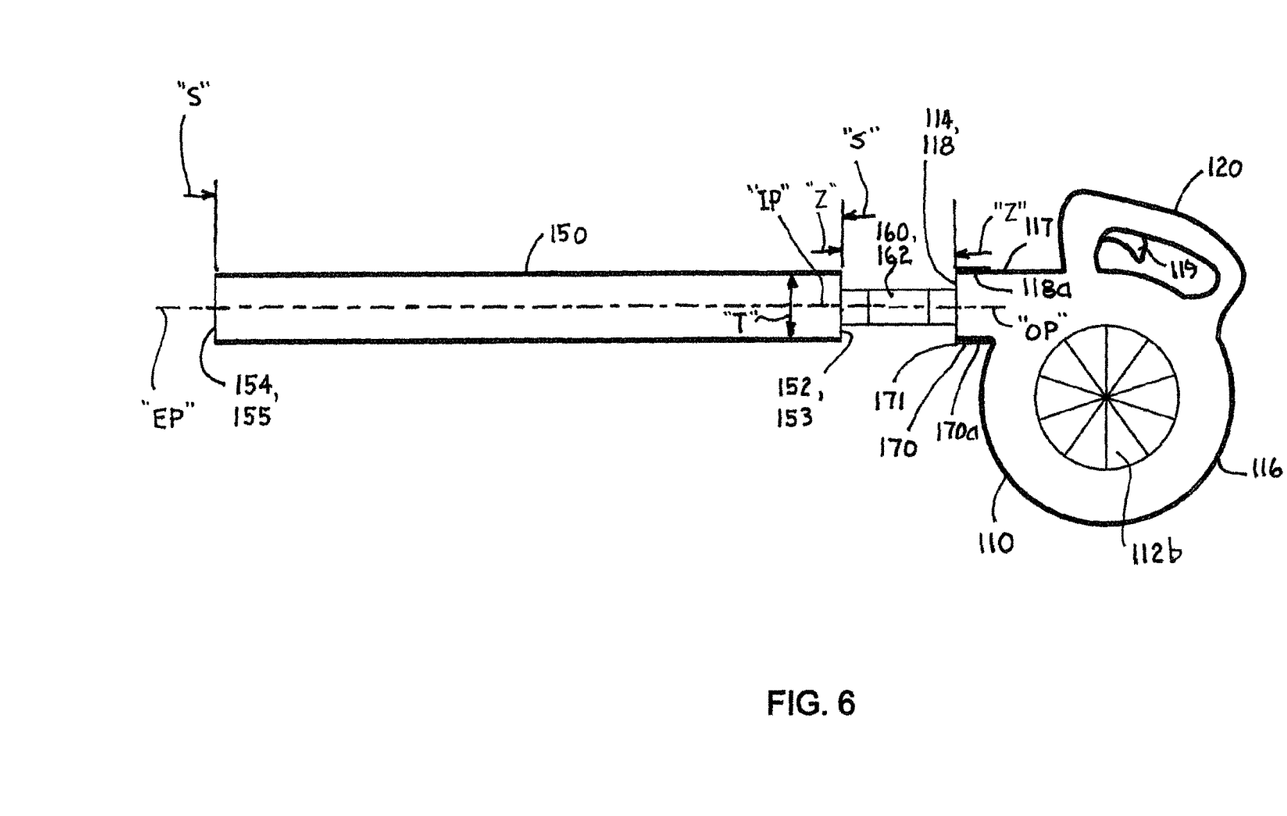
FIG. 6 is a sectional left side elevational view of the portable leaf blower of FIG. 1, taken along section line 6-6 of FIG. 4, and with the rotatable impeller and the motor not shown for the sake of clarity; and, FIG. 7 is a left side elevational view of the portable leaf blower of FIG. 1, with the blower tube separated from the main body.
Figure 7:
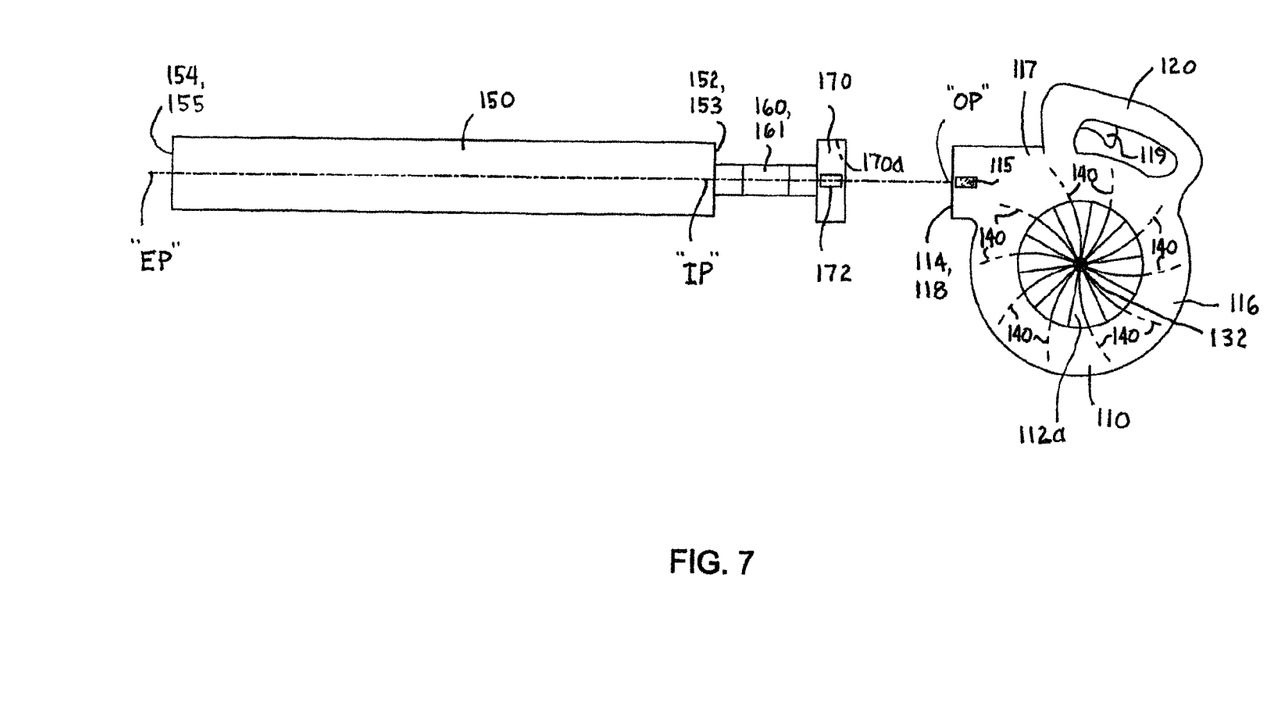

Also, in the first illustrated embodiment, and as can be best seen FIGS. 5 and 6, the tube ingress port 152 is of substantially congruent internal cross-section to the air outlet port 114, and the tube ingress port 152 has substantially the same internal cross-section as the air outlet port 114. This allows the properly directed air from the air outlet port 114, as indicated by arrows "A", to readily flow into the tube ingress port 152 without undo interruption. Further, the tube ingress port 152 and the air outlet port 114 are each generally circular in internal cross-section, typically for purposes of ease of manufacturing. In the first illustrated embodiment, the internal cross-section of the tube ingress port 152 and the air outlet port 114 are each preferably in the range of about 4.0 to about 6.0 inches in diameter.

In the first illustrated embodiment, the at least one spacer member 160 comprises at least one spacer arm (web), and more specifically comprises a first spacer arm (web) 161 and a second spacer arm (web) 162. Each of the first and second spacer arms (webs) 161,162 comprises a web of supporting material. Further each of the first and second spacer arms (webs) 161,162 is preferably formed from a suitable strong, rigid plastics material, and each web of material is preferably integrally formed with the blower tube 150 of the same type of strong, rigid plastics material. The collar member 170 is substantially rigidly connected to the first and second spacer arms (webs) 161,162, and is also preferably formed from the same strong, rigid, plastics material, and also is integrally formed with the first and second spacer arms (webs) 161,162 and the blower tube 150. The blower tube 150, the first and second spacer arms (webs) 161,162, and the collar member 170 can be formed by injection molding or blow molding, or by any other suitable method of manufacture, as deemed appropriate.

The collar member 170 is adapted for selectively engaging the housing 110 in secured relation, and more specifically, is adapted for engaging the housing outlet tube 117 adjacent the distal end 118 thereof in secured relation. To this end, the shape of the inner surface 170*a* of the collar member 170 and the shape of the outer surface 118*a* of the distal end 118 of the housing outlet tube 117 are preferably complementary one with the other. Further, the inner diameter of the collar member 170 is preferably very slightly greater than the outer diameter of the distal end 118 of the housing outlet tube 117. A pair of spring-loaded releasable locking mechanisms 115 may be located adjacent the distal end 118 of the housing outlet tube 117 to engage a pair of co-operating apertures 172 on the collar member 170 to hold the collar member 170 in operative mounted relation on the housing outlet tube 117. Any other conventional releasable locking mechanism may be utilized on the housing outlet tube 117 and the collar member 170 to releasably connect the collar member 170 (and the attached blower tube 150) in fixed relation to the housing 110, with the tube ingress port 152 positioned in spaced relation to the air outlet port 114, and with said air outlet port 114 being substantially coincident with said tube ingress port axis "IP".

A possible alternative example of a conventional releasable locking mechanism comprises one or more locking pins (not shown) arranged to project from the internal circumference of the collar member 170 to slidingly engage with one or more respective mating track slots formed around the outer circumference of the housing outlet tube 117 during rotation of the blower tube 150, which locking pins frictionally lock up with a blind-ended off-set portion of the track slot at a predetermined rotational position of the blower tube relative to the housing outlet tube 117. Any other known releasable locking mechanism suitable for releasable connecting the blower tube to the housing or the handle is also intended by the inventor(s) as within the scope of the claimed invention.

As generally described above and illustrated in the Figures, the blower tube 150 is connectable in supported relation, and in removable and replaceable relation, to at least one of the housing 110 and the handle 120. In the first illustrated embodiment, the blower tube 150 is connectable in supported relation, and in removable and replaceable relation, to the housing 110. More specifically, the blower tube 150 is connectable in supported relation, and in removable and replaceable relation, to the housing 110 by the first and second spacer arms (webs) 161,162, and the collar member 170.

Further, as is best seen in FIGS. 1 through 3 and 6, the blower tube 150 is connectable in supported relation to the housing 110, as described above, such that the tube ingress port 152 is positioned in spaced relation to the air outlet port 114, with the air outlet port axis "OP" being coincident with the tube ingress port axis "IP". As can be readily seen, the tube ingress port 152 is positioned in spaced relation from the air outlet port 114 by a first axial distance "Z", which distance can, of course, vary significantly depending upon other parameters and specifications of the leaf blower.

Further, the length of the blower tube 150 from the tube ingress port 152 to the tube egress port 154 is denoted by a second axial distance "S". The tube ingress port 152 is shown in the drawings as being circular in cross-section, although it will be readily apparent to those skilled in the art that it may take on any other conventional geometry (e.g. rectangular, square, triangular, ovoid, etc.) known in the art, as may the air outlet port 114 and the other air channels, tubes, passageways and openings of the leaf blower 100. The diameter of the tube ingress port 152 shown is a first transverse distance "T", and the ratio of the first axial distance "Z" to the first transverse distance "T" may usefully (but not essentially) be between about 1:1 and 1:1.4, and preferably (but not essentially), between about 1:1.2, where a circular cross-section is used, as illustrated.

Irrespective of the specific geometry or dimensions used for in the construction of the air outlet port 114, the tube ingress port 152 and their connected air channels, tubes and passageways, an important aspect of the present invention is that the peripheral open area between the air outlet port 114 and the tube ingress port 152 is large enough to permit a significant supplemental airflow to be drawn (entrained) into the tube ingress port 152, as caused by the airflow from the air outlet port 114. As seen in the Figures and as confirmed by experiment, the peripheral (circumferential as shown in the drawings) open area between the air outlet port 114 and the tube ingress port 152 is usefully (but not essentially) greater than about ninety (90) percent, and is preferably (but not essentially) greater than about ninety-five (95) percent of the overall peripheral (circumferential) area between the air outlet port 114 and the tube ingress port 152.

In use, in order to move leaves on a surface such as the ground or a walkway, the housing outlet tube 117 of the portable leaf blower 100 is aimed at the leaves, and the electrical switch 119 is manually manipulated to turn on the electric motor 130. The electric motor 130 turns the rotatable impeller 140 at a high rate of speed, as indicated by arrows "R", to thereby draw air into the left air inlet 112*a* and the right air inlet 112*b*, as indicated by arrows "A", and create a forceful airflow through the housing 110, as indicated by arrows "B", through the housing outlet tube 117, as indicated by arrows "C", and out of the air outlet port 114, as indicated by arrows D". The forceful airflow travels from the air outlet port 114 of the housing outlet tube 117 and through the space between the air outlet port 114 and the tube ingress port 152, as indicated by arrows "E", during which travel it draws (entrains) a significant supplemental airflow along with it into the tube ingress port 152, as indicated by arrows "F", from the surrounding space, as indicated by arrows "G". The significantly increased airflow continues along the interior of the blower tube 150, as indicated by arrows "H", and exits the blower tube 150 at the tube egress port 154, as indicated by arrows "I", to thereby impact leaves and other debris on the surface being cleaned.

Many non-inventive modifications and variations of the embodiments shown in the Figures and describe above are possible that will be readily apparent to those skilled in the art. For instance, the at least one spacer member 160 could comprise a robust single spacer arm (web) that is significantly thicker and stronger than the two arm members (webs) shown in the above described embodiments, thereby further increasing the peripheral open area between the air outlet port 114 and the tube ingress port 152, the maximization of which is desirable to the principles of the present invention. Moreover, such a single spacer arm (web) could, for example, be releasably connected, either directly or indirectly, in a wide variety of functionally equivalent ways, to the front of the handle or the front of the housing, rather than directly to the housing outlet tube 117 as shown in the two illustrated embodiments.

Additionally, there is no requirement in the present invention to have, as illustrated in the appended drawings, a motor and impeller mounted within the housing to draw the initial air supply for the device 100 into the housing 100 from one or more air inlets 112a, 112b positioned on opposite sides of the main body 116. Rather, the initial air flow into the housing may, unlike the arrangement illustrated in the Figures appended hereto, be in a linear direction substantially parallel (i.e., coincident) with the air outlet port axis, such as is utilized in, for example, STIHL® Model BGA 85 handheld leaf blower, available from STIHL Incorporated, of Virginia Beach, Va. USA.

Other variations of the above structures and principles of operation will be readily apparent to those who are knowledgeable in the field of the invention, and such variations are considered to be within the scope of the present invention. Further, other modifications and alterations may be used in the design and manufacture of a portable leaf blower according to the present invention, without departing from the spirit and scope of the present invention as limited only by the accompanying claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

The invention claimed is:

1. A portable leaf blower comprising:
a housing having an air inlet and an air outlet port defining an air outlet port axis;
a handle attached to the housing;
a motor mounted within said housing and having a rotatable drive shaft;
a rotatable impeller mounted on said drive shaft for rotation therewith, and to draw air into the air inlet and to blow said air out of the air outlet port in generally parallel relation to said air outlet port axis;
a blower tube having a tube ingress port and a tube egress port, said blower tube defining a tube ingress port axis, and being connected in supported relation to at least one of said housing and said handle by at least one spacer member, with said tube ingress port is being positioned in spaced relation to said air outlet port to define a peripheral open area between the air outlet port and the tube ingress port, and with said air outlet port axis being substantially coincident with said tube ingress port axis.

2. The portable leaf blower according to claim 1, wherein said blower tube is connected in said supported relation to said housing.

3. The portable leaf blower according to claim 1, wherein said tube ingress port is of substantially congruent internal cross-section to said air outlet port.

4. The portable leaf blower according to claim 1, wherein said tube ingress port has the same internal cross-section as said air outlet port.

5. The portable leaf blower according to claim 4, wherein said tube ingress port and said air outlet port are each circular in internal cross-section.

6. The portable leaf blower according to claim 5, wherein the internal cross-section of said tube ingress port and said air outlet port are each in the range of about 4.0 inches (10.16 centimeters) to about 6.0 inches (15.24 centimeters in diameter).

7. The portable leaf blower according to claim 1, wherein said tube ingress port is positioned in spaced relation from said air outlet port by a first axial distance of from about 2.0 inches (5.08 centimeters) to about 3.0 inches 7.62 centimeters).

8. The portable leaf blower according to claim 1, wherein said blower tube egress port defines a tube egress port axis that is in generally aligned parallel relation to said tube ingress port axis.

9. The portable leaf blower of according to claim 1, wherein said motor is selected from a group consisting of AC powered motors, DC powered motors, and gasoline powered motors.

10. The portable leaf blower according to claim 1, wherein said at least one spacer member comprises a web of material.

11. The portable leaf blower of according to claim 10, wherein said web of material is formed from a plastics material.

12. The portable leaf blower according to claim 11, wherein said web of material is integrally formed with said blower tube.

13. The portable leaf blower according to claim 4, wherein said tube ingress port and said air outlet port are each circular in internal cross-section and said tube ingress port is positioned in spaced relation to said air outlet port by said first axial distance, and the diameter of said tube ingress port of said blower tube is a first transverse distance, and wherein the ratio of said first axial distance to said first transverse distance is between about 1:1 and 1:1.4.

14. The portable leaf blower according to claim 13, wherein the ratio of said first axial distance to said first transverse distance is about 1:1.2.

15. The portable leaf blower according to claim 4, wherein the peripheral open area existing between the air outlet port and the tube ingress port is greater than 90% of the overall peripheral area therebetween.

16. The portable leaf blower of claim 15, wherein the peripheral open area existing between the air outlet port and the tube ingress port is greater than 95% of the overall peripheral area therebetween.

17. The portable leaf blower according to claim 1, wherein the blower tube is connected in removable and replaceable relation to one of said housing and said handle.

18. The portable leaf blower of claim 17, wherein said at least one spacer member comprises at least one spacer arm.

19. The portable leaf blower of claim 18, wherein said at least one spacer arm comprises a first spacer arm and a second spacer arm.

20. The portable leaf blower of claim 17, further comprising a collar member substantially rigidly connected to said at least one spacer member for engaging the housing in secured relation.

* * * * *